United States Patent
Choi

(10) Patent No.: US 11,616,829 B2
(45) Date of Patent: Mar. 28, 2023

(54) APPARATUS FOR PROVIDING FOLDER CHAT ROOM AND APPARATUS FOR RECEIVING THE SAME

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

(*) Notice: Subject to any disclaimer, the term of this patent is extended or adjusted under 35 U.S.C. 154(b) by 124 days.

(21) Appl. No.: 16/282,568

(22) Filed: Feb. 22, 2019

(65) Prior Publication Data
US 2020/0274916 A1 Aug. 27, 2020

(51) Int. Cl.
| H04L 67/06 | (2022.01) |
| H04L 51/04 | (2022.01) |
| H04L 9/40 | (2022.01) |
| H04L 51/216 | (2022.01) |
| H04L 51/234 | (2022.01) |
| H04L 12/18 | (2006.01) |

(52) U.S. Cl.
CPC ............ *H04L 67/06* (2013.01); *H04L 51/04* (2013.01); *H04L 51/216* (2022.05); *H04L 51/234* (2022.05); *H04L 63/10* (2013.01); *H04L 12/1818* (2013.01)

(58) Field of Classification Search
CPC ......... H04L 67/06; H04L 51/04; H04L 51/16; H04L 51/34; H04L 63/10
See application file for complete search history.

(56) References Cited

U.S. PATENT DOCUMENTS

| 7,328,242 B1* | 2/2008 | McCarthy | G06Q 10/10 709/203 |
| 9,298,355 B1* | 3/2016 | Beausoleil | H04L 51/36 |
| 2005/0050143 A1* | 3/2005 | Gusler | G06Q 10/107 709/206 |
| 2006/0064434 A1* | 3/2006 | Gilbert | G06Q 10/06 |
| 2009/0172101 A1* | 7/2009 | Arthursson | G06F 9/452 709/205 |

(Continued)

FOREIGN PATENT DOCUMENTS

| KR | 10-1295209 B1 | 9/2013 |
| KR | 10-2013-0143316 A | 12/2013 |

(Continued)

OTHER PUBLICATIONS

Korean Office Action for related KR application No. 10-2017-0112340 dated Sep. 17, 2018 from Korean Patent Office.

(Continued)

*Primary Examiner* — Jonathan A Bui
*Assistant Examiner* — Kidest Mendaye
(74) *Attorney, Agent, or Firm* — Paratus Law Group, PLLC

(57) ABSTRACT

An apparatus for providing a folder chat room includes: a memory; and a processor electrically connected to the memory, wherein the processor receives a request for access to a folder from a user terminal, provides a list of files in the folder, and determines the user terminal's right to access a folder chat room and provides at least part of a message thread that is associated with the folder and rendered as a folder chat room on the user terminal.

21 Claims, 8 Drawing Sheets

(56) References Cited

U.S. PATENT DOCUMENTS

| | | | | |
|---|---|---|---|---|
| 2011/0185025 | A1* | 7/2011 | Cherukuri | H04L 12/1813 |
| | | | | 709/206 |
| 2013/0194301 | A1* | 8/2013 | Robbins | G06F 21/10 |
| | | | | 345/629 |
| 2016/0224939 | A1* | 8/2016 | Chen | G06Q 10/06311 |
| 2017/0111305 | A1* | 4/2017 | Bastide | H04L 51/16 |
| 2018/0124129 | A1* | 5/2018 | Geisler | H04L 67/306 |
| 2019/0387033 | A1* | 12/2019 | Araki | H04L 65/4015 |
| 2020/0089785 | A1* | 3/2020 | Lee | H04L 67/06 |

FOREIGN PATENT DOCUMENTS

| | | |
|---|---|---|
| KR | 10-2014-0104967 A | 8/2014 |
| KR | 10-2015-0073229 A | 7/2015 |

OTHER PUBLICATIONS

Jandi; Main page; http://blog.jandi.com/ko/category/about-jandi/; published Mar. 8, 2019.

Jandi; "How to make the best use of Lawn Connect"; http://blog.jandi.com/ko/2016/10/31/jandi-connect-best-cases/; published Oct. 31, 2016.

Jandi; "Band at the meeting? Work grass! Comparison of grass vs band lightning"; http://blog.jandi.com/ko/2015/07/28/jandi-vs-band/; published Jul. 28, 2015.

Jandi; "Grass Updates: Enhanced administrator privileges (set up team members + invite guests)"; http://blog.jandi.com/ko/2017/01/10/jandi-update-12/; published Jan. 10, 2017.

* cited by examiner

FIG. 7B

APPARATUS FOR PROVIDING FOLDER CHAT ROOM AND APPARATUS FOR RECEIVING THE SAME

BACKGROUND

The present invention relates to a technology for providing a folder chat room, and more particularly, to an apparatus for providing a folder chat room and an apparatus for receiving the same, that are capable of improving the efficiency of folder sharing by supporting communication between folder-sharing users through a folder chat room.

An internet messenger is an application that transmits messages containing text or graphics between users, and may come in the form of a chat room which a plurality of users can join. In an exemplary embodiment, the internet messenger may be a mobile messenger that runs in a mobile environment (for example, on a mobile phone), examples of which include KakaoTalk, Line, WeChat, Facebook Messenger.

With the rapid increase in the number of users using internet messengers, more diverse applications are being developed for use in mobile environments. Among them, file sharing programs are being used by a large number of users.

Korean Laid-Open Patent No. 10-2015-0073229 (filed on Jul. 1, 2015) relates to a system and method for sharing files within a messenger group, and the system includes: a plurality of user terminals for typing text in a chat; a messenger server for providing messenger service to the plurality of user terminals; a file sharing server for receiving files from a group consisting of some of the plurality of user terminals; and an authentication server for performing some form of authentication required when using the file sharing server.

Korean Laid-Open Patent No. 10-2014-0104967 (filed on Aug. 29, 2014) relates to a technique for sharing and transmitting messaging content between users, and the technique includes: displaying messaging content associated with a user; receiving a request to share at least part of the messaging content with a recipient; accessing the messaging content associated with the user; and transmitting the messaging content to the recipient.

PRIOR ART DOCUMENTS (Patent Document 1) Korean Laid-Open Patent No. 10-2015-0073229 (filed on Jul. 1, 2015)
(Patent Document 2) Korean Laid-Open Patent No. 10-2014-0104967 (filed on Aug. 29, 2014)

SUMMARY

The present invention provides an apparatus for providing a folder chat room and an apparatus for receiving the same, that are capable of improving the efficiency of folder sharing by supporting communication between folder-sharing users through a folder chat room.

The present invention also provides an apparatus for providing a folder chat room and an apparatus for receiving the same, that are capable of increasing the convenience of use for folder sharers by providing users with a folder chat room for each folder where they can communicate with each other.

The present invention also provides an apparatus for providing a folder chat room and an apparatus for receiving the same, that are capable of increasing the efficiency of task processing between folder sharers by showing the count of unread messages in a folder chat room for each folder.

An exemplary embodiment of the present invention provides an apparatus for providing a folder chat room, the apparatus comprising: a memory; and a processor electrically connected to the memory, wherein the processor receives a request for access to a folder from a folder chat room receiving apparatus, provides a list of files in the folder, and determines the folder chat room receiving apparatus' rights to access a folder chat room and provides at least part of a message thread that is associated with the folder and rendered as a folder chat room on the folder chat room receiving apparatus.

When the folder is created by a folder creator, the processor may create the message thread and determine at least one participant in the folder chat room by inviting users by the folder creator.

The processor may approve a user invitation request based on whether the user invitation request is for a folder sharer of the folder.

If the user invitation request is for at least one user who is not a folder sharer, the processor may first send a folder sharing invitation to each of the at least one user and then send the user invitation if the folder sharing invitation is approved.

Upon receiving a folder message from a sender, who is one of the participants of the folder chat room, the processor may inform a recipient terminal associated with a recipient, who is one of the participants of the folder chat room, when the folder message arrives.

The processor may receive a task object from a task creator, one of the participants in the folder chat room, through the folder chat room, which contains task details and a task assignee and about which the task assignee gives feedback, and add the received task object as a task object message to the message thread.

Upon receiving a file object from a sender, who is one of the participants of the folder chat room, the processor may add to the message thread a file object message containing an access link for access the file object, and let one of the participants open or modify the file object only when accessing the file object through the folder chat room.

In the process of creating a message thread, the processor may store the message thread as a folder message file defined by a server only file attribute.

The processor may store the folder message file in association with a file object or sub-folder in the folder, based on a request from the folder chat room receiving apparatus.

Upon receiving a request to move the folder message file or a file object or sub-folder associated with the folder message file, the processor may move the folder message file and the file object or sub-folder associated with the folder message file to another folder.

In the process of creating a message thread, the processor may store the message thread in a specific area of a file system and manage the association between the folder and the message thread through a folder message database.

Upon receiving a request to move the folder or change the folder name, the processor may update the association between the folder and the message thread by modifying the folder message database.

The processor may form an association between the message thread and a file object or sub-folder in the folder by modifying the folder message database based on a request from the folder chat room receiving apparatus.

Upon receiving a request to move the folder chat room or a file object or sub-folder associated with the folder chat room to another folder, the processor may update the association among the folder, the message thread, the associated file object or sub-folder, and the another folder by modifying the folder message database.

If the folder chat room is designated as a root folder chat room, the processor may have the folder chat room set up as the root folder chat room for the folder and sub-folders thereof until a sub-folder chat room is designated as another root folder chat room.

Each time a message is added to the folder chat room, the processor may detect statistical information about messages not read by the user from all the message threads in the folder and sub-folders thereof and reflect the same on the count of unread messages in the folder.

The processor may detect statistical information about task objects created through at least one message thread associated with the folder and all the sub-folders thereof and reflect the same on cumulative statistical counts for the folder.

The processor may detect task objects that meet reminder requirements at specific time intervals, from among the task objects created through the at least one message thread, and reflect the same in a today's list of tasks in the folder.

The processor may perform filtering on the folder or arrange the folder based on statistical information about the unread messages or statistical information about the task objects, according to a request from the folder chat room receiving apparatus.

When an association between a file object in the folder and the folder chat room is formed, or when a file object associated with the folder chat room is modified or deleted, the processor may add a notification message to the message thread, about the formation of the association or the modification or deletion.

Each time a file object associated with the folder chat room is updated, the processor may detect the number of updates to the associated file object not checked by the user by counting the cumulative number of updates, and may reset the number of unchecked updates when the associated file object is opened by the user.

Another exemplary embodiment of the present invention provides an apparatus for receiving a folder chat room, the apparatus comprising: a memory; and a processor electrically connected to the memory, wherein the processor sends a request for access to a folder to a folder chat room providing apparatus, receive a list of files in the folder, and, upon approval of access to a folder chat room associated with the folder, receives at least part of a message thread associated with the folder from the folder chat room providing apparatus and provides a file window for providing the file list and a folder chat room window, which is a rendering of part of the message thread, in association with each other.

BRIEF DESCRIPTION OF THE DRAWINGS

FIGS. 7A and 7B are views showing an exemplary embodiment of a process in which the folder chat room receiving apparatus in FIG. 1 provides a file sharing interface by working in conjunction with a folder chat room providing apparatus.

DETAILED DESCRIPTION

Figure 1:
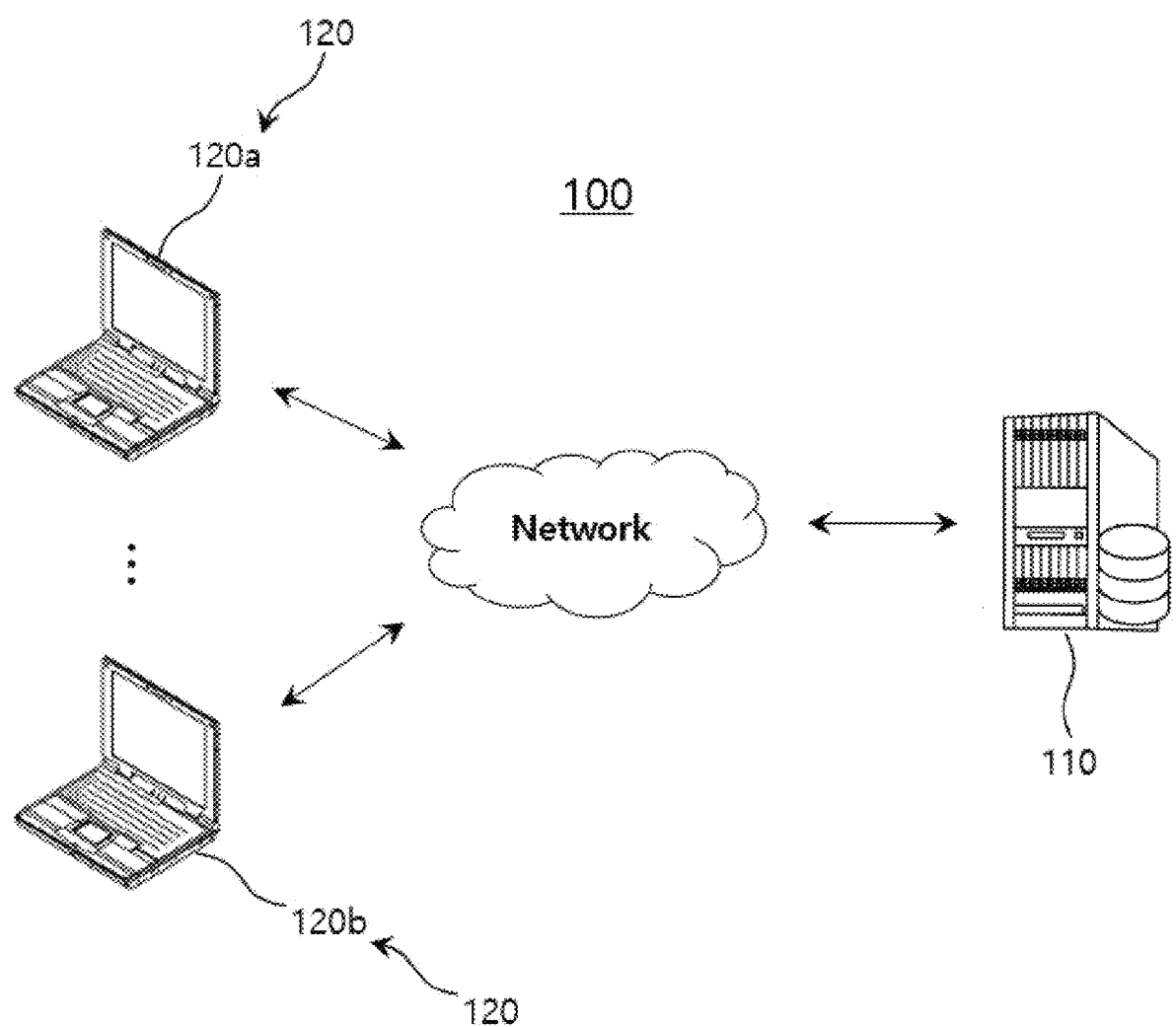
FIG. 1 is a view illustrating a folder chat room provision system according to an exemplary embodiment of the present invention.

Explanation of the present invention is merely embodiments for structural or functional description, so the scope of the present invention should not be construed to be limited to the embodiments explained in the embodiment. That is, since the embodiments may be implemented in several forms, it should also be understood that the scope of the present invention includes equivalents able to realize its technical idea. In addition, it does not mean that a specific embodiment embraces all the purposes or effects suggested in the present invention or embraces only such effects, and therefore, it should be understood that the scope of the present invention is not limited thereto.

Meanwhile, terms used in the following description need to be understood as below.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

Identification symbols (e.g., a, b, c, etc.) of individual steps are used for convenience of description and do not describe a sequence of the steps. The individual steps may be performed in a sequence different from a described sequence unless a specific sequence is clearly described in the context. In other words, the steps may be performed in the described sequence, performed substantially at the same time, or performed in a reverse sequence.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable recording medium may be distributed in a computer system connected by a network, and store and implement a computer-readable code in a distributed manner.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

FIG. 1 is a view illustrating a folder chat room provision system according to an exemplary embodiment of the present invention.

Referring to FIG. 1, a folder chat room provision system 100 includes a folder chat room providing apparatus 110 and a folder chat room receiving apparatus 120, which may be connected through a network.

The folder chat room providing apparatus 110 is a computing device that can be connected to at least one folder chat room receiving apparatus 120. In an exemplary embodiment, the folder chat room providing apparatus 110 may manage at least one group in which a user associated with the folder chat room receiving apparatus 120 is included as a member, manage groups of associated members by folder, and manage message threads into which messages transmitted by groups created through at least one folder chat room receiving apparatus 120 are grouped.

In an exemplary embodiment, the folder chat room providing apparatus 110 may be connected to the folder chat room receiving apparatus 120 through a folder chat room-based file sharing agent installed on the folder chat room receiving apparatus 120. In an exemplary embodiment, the folder chat room-based file sharing agent is an agent program, which is software that, once installed on the folder chat room receiving apparatus 120, allows the folder chat room receiving apparatus 120 and the folder chat room providing apparatus 110 to be connected and work in conjunction with each other through a network under approval from the folder chat room receiving apparatus 120.

The folder chat room receiving apparatus 120 is a computing device that can be connected to the folder chat room providing apparatus 110 through a network—for example, a user terminal that comes in the form of a desktop, a laptop, a tablet PC, or a smartphone. In an exemplary embodiment, a first folder chat room receiving apparatus 120a may be a mobile terminal, and may be connected to the folder chat room providing apparatus 110 through cellular communication or WiFi communication. In another exemplary embodiment, a second folder chat room receiving apparatus 120b may be a desktop, and may be connected to the folder chat room providing apparatus 110 through the internet.

Figure 2:
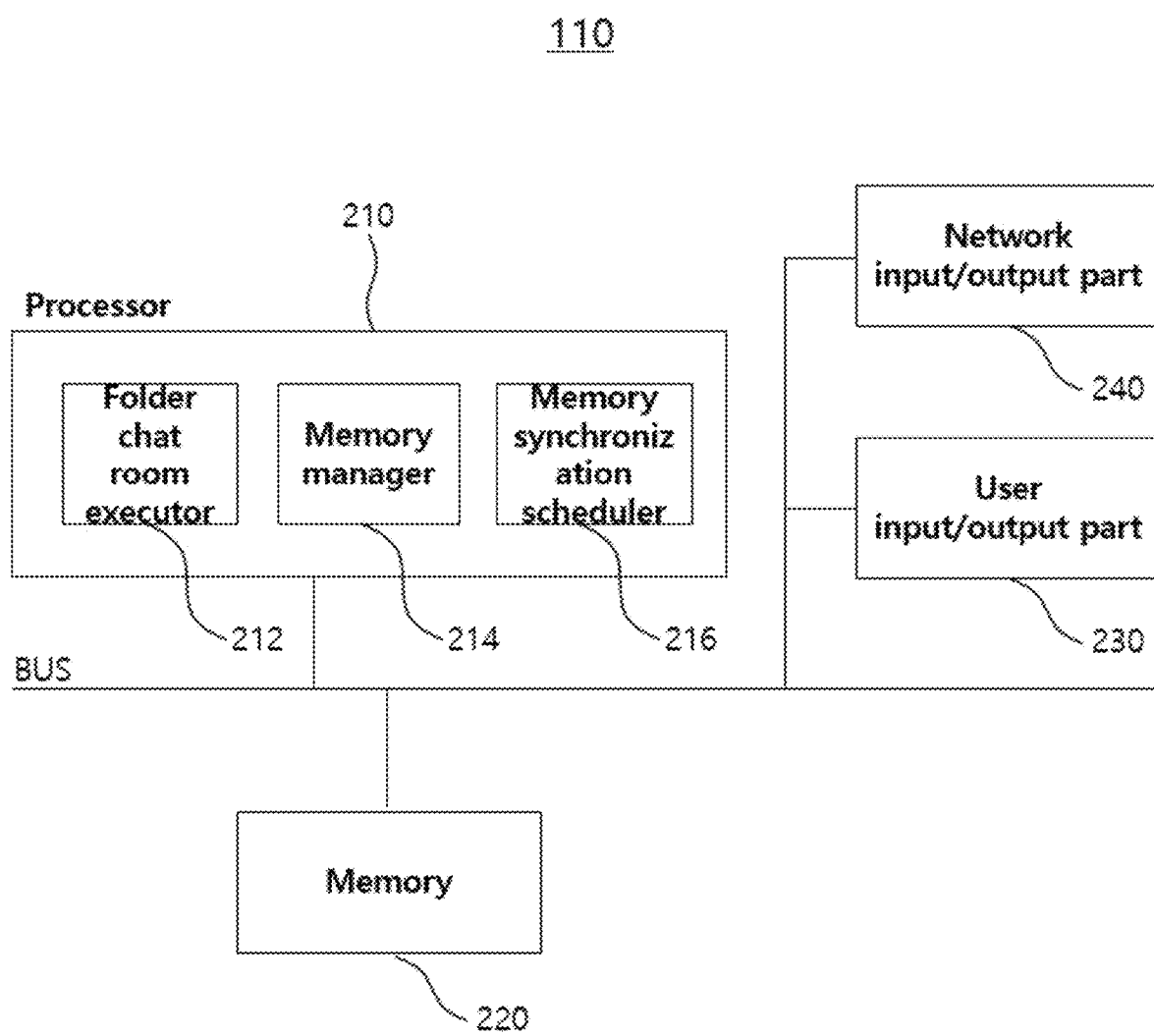
FIG. 2 is a block diagram showing the folder chat room providing apparatus in FIG. 1.

FIG. 2 is a block diagram showing the folder chat room providing apparatus in FIG. 1.

Referring to FIG. 2, the folder chat room providing apparatus 110 may include a processor 210, a memory 220, a user input/output part 230, and a network input/output part 240.

Figure 4:
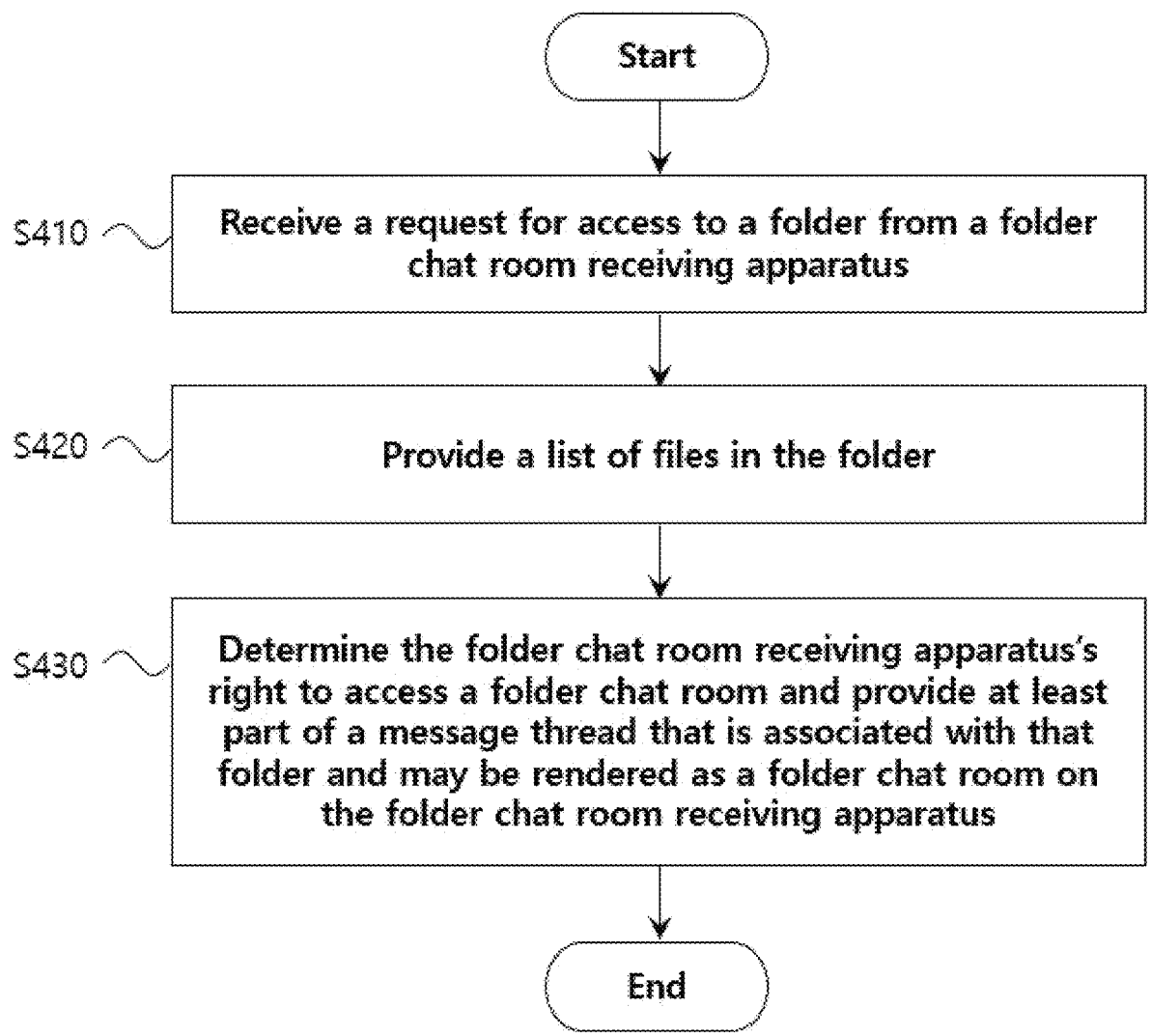
FIG. 4 is a flowchart illustrating a folder chat room providing procedure performed by the processor in FIG. 2.

The processor 210 may include a folder chat room executor 212 capable of executing a folder chat room provision procedure in FIG. 4, a memory manager 214 capable of managing the memory 220 which is read or written by the folder chat room executor 212, and a memory synchronization scheduler 216 capable of scheduling time synchronization between volatile and non-volatile memories in the memory 220. The processor 210 may control the overall operation of the folder chat room providing apparatus 110, and may be electrically connected to the memory 220, user input/output part 230, and network input/output part 240 and control data follow between them. The processor 210 may be implemented as a CPU (Central Processing Unit) of the folder chat room providing apparatus 110.

The memory 220 may include auxiliary storage which is implemented as a non-volatile memory such as SSD (Solid State Disk) or HDD (Hard Disk Drive) and used to store overall data required for the folder chat room providing apparatus 110 and primary storage which is implemented as a volatile memory such as RAM (Random Access Memory). That is to say, the memory 220 may be implemented as a volatile or non-volatile memory, and may be connected by a hyperlink if implemented as a non-volatile memory.

The user input/output part 230 includes an environment for receiving user input and an environment for outputting particular information to the user—for example, an input device including an adapter such as a mouse, trackball, touchpad, graphic tablet, scanner, touchscreen, keyboard, or pointing device, and an output device including an adaptor such as a monitor or touchscreen. In an exemplary embodiment, the user input/output part 230 may correspond to a computing device connected via a remote connection, in which case the folder chat room providing apparatus 110 may serve as a server.

The network input/output part 240 may include an environment for connecting to the folder chat room receiving apparatus 120 via a network—for example, an adapter for LAN (Local Area Network) communication.

Figure 3:
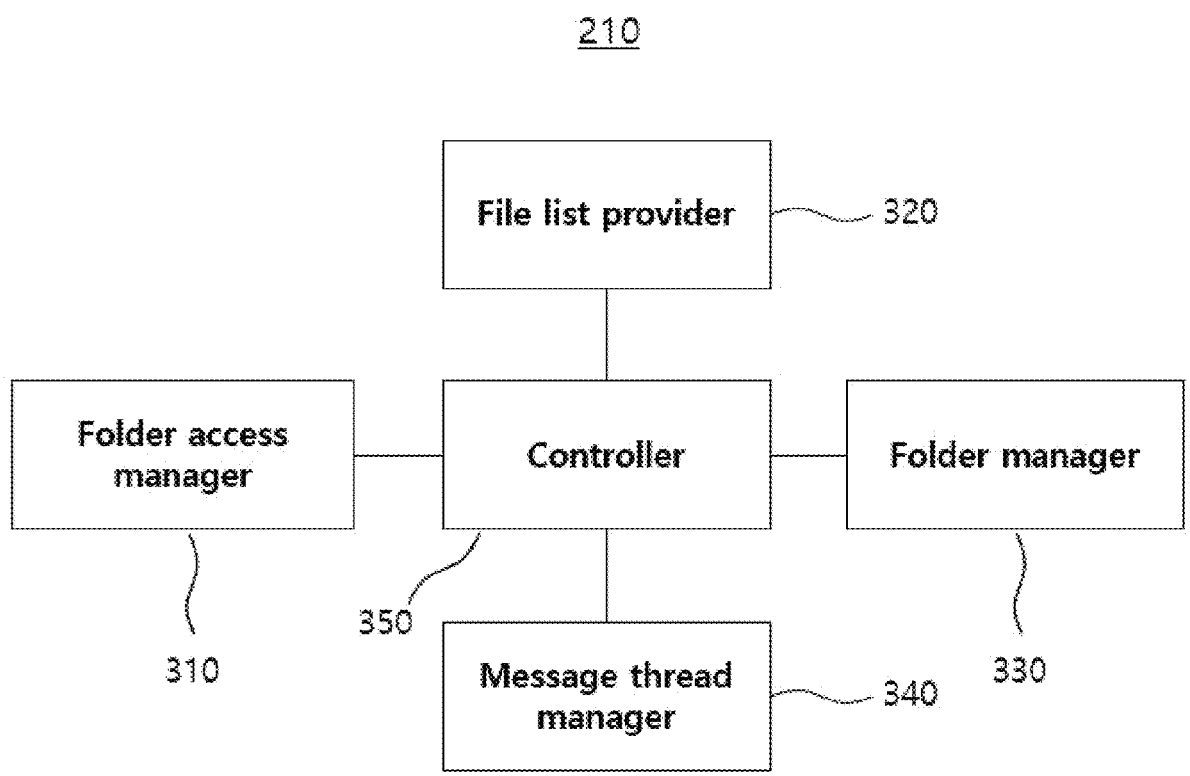
FIG. 3 is a block diagram showing functional elements of the processor shown in FIG. 2.

FIG. 3 is a block diagram showing functional elements of the processor shown in FIG. 2.

Referring to FIG. 3, the processor 210 may include a folder access manager 310, a file list provider 320, a folder manager 330, a message thread manager 340, and a controller 350.

The folder access manager 310 may detect access or receive a request to access a folder from the folder chat room receiving apparatus 120. More specifically, the folder access manager 310 may receive a request for access to a particular folder from the folder chat room receiving apparatus 120, and may check whether a user associated with the folder chat room receiving apparatus 120 has the right to access the particular folder and approve the access.

The file list provider 320 may provide a list of files in a folder. More specifically, when a request for access to a particular folder from one of folder sharers who have the right to access that folder is approved, the file list provider 320 may provide the folder chat room receiving apparatus 120 associated with the requestor with a file list for at least either file objects or sub-folders in the particular folder.

In an exemplary embodiment, the file list provider 320 may provide the folder chat room receiving apparatus 120 with a list of files except folder message files, so as to restrict the folder chat room receiving apparatus 120's access to the folder message files stored in the folder. The folder message files will be discussed in more details in the description of the message thread manager 340.

The folder manager 330 may create and manage folders. The folder manager 330 may create and manage at least either file objects or sub-folders in the folder, based on a user request. Here, the file objects may include general user files such as document files or multimedia files that may be sent from the folder chat room receiving apparatus 120. Upon receiving a folder creation request from the folder chat room receiving apparatus 120, the folder manager 330 may create a particular folder for which a user associated with the folder chat room receiving apparatus 120 is designated as a folder creator, and may determine at least one user as a folder sharer with whom the particular folder is shared, by inviting sharers by the folder creator.

When a folder is created by a folder creator, the folder manager 330 may grant the folder creator the right to access the folder and grant each user who is determined as a folder sharer the right to access the folder. Upon an attempt to access the folder, the folder manager 330 may check whether the folder creator or folder sharer has the right to access the folder and allow each requestor to access the folder.

The message thread manager 340 may determine the folder chat room receiving apparatus 120's right to access the folder chat room and provide at least part of a message thread associated with the folder. Here, the message thread may be rendered as a folder chat room on the folder chat room receiving apparatus 120, and, in an exemplary embodiment, at least one message thread may be created in association with the folder.

More specifically, when the folder chat room receiving apparatus 120 is allowed access to a particular folder, the message thread manager 340 may check whether the requestor associated with the folder chat room receiving apparatus 120 has the right to access the folder chat room associated with the particular folder, and when the access to that folder chat room is approved, the message thread manager 340 may provide the folder chat room receiving apparatus 120 with at least part of a message thread associated with the folder and allow the folder chat room receiving apparatus 120 to render the received at least part of the message thread as a folder chat room. The message thread manager 340 may split at least part of the message thread into chat thread pieces for a specific number of time slots and provide them in reverse chronological order.

In an exemplary embodiment, the message thread manager 340 may provide a folder chat room list of all folder chat rooms associated with the folder, based on the folder chat room receiving apparatus 120's rights to access the folder chat rooms. The message thread manager 340 provide the folder chat room receiving apparatus 120 associated with the requestor with a folder chat room list containing at least either participant information or recently-added information about each one folder chat room that is associated with the folder and which the requestor is found to have the right to access (see FIGS. 7A and 7B).

Figure 7A:
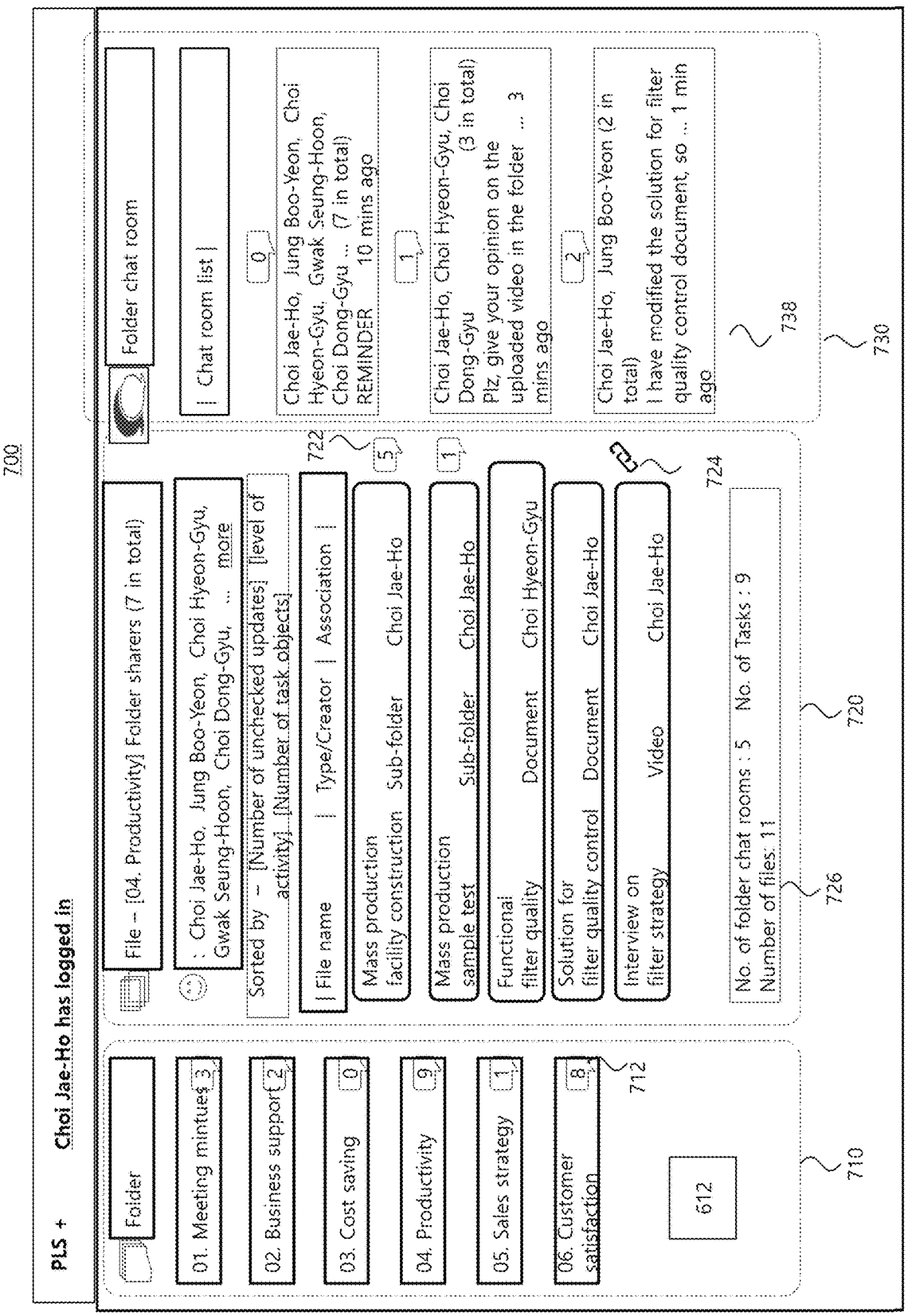
Figure 7B:
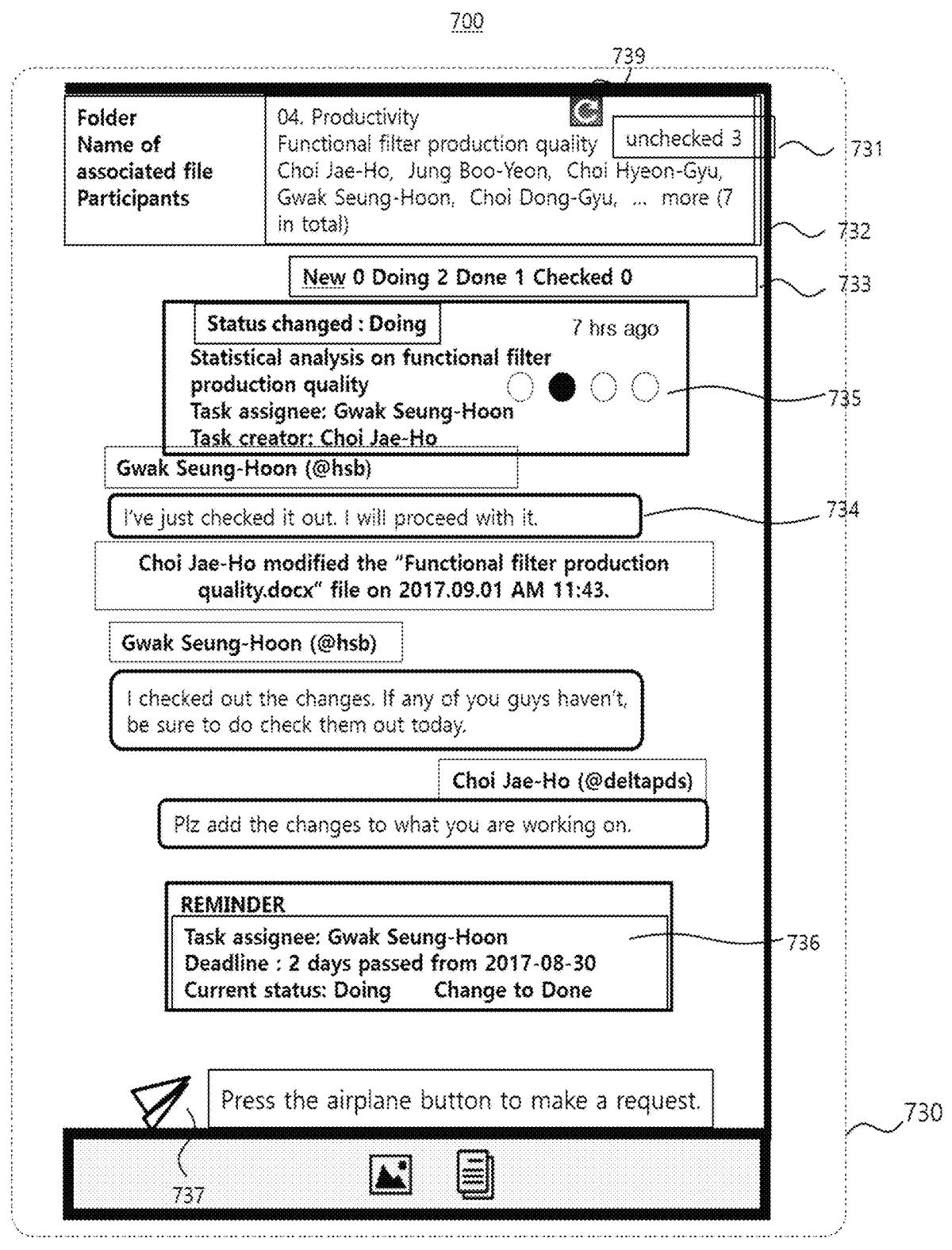

In an exemplary embodiment, upon receiving a request for access to a particular folder chat room from the folder chat room receiving apparatus 120 through a list of folder chat rooms, the message thread manager 340 may immediately provide the folder chat room receiving apparatus 120 with at least part of a message thread to which access is requested, so that the folder chat room receiving apparatus 120 renders it as a folder chat room (see FIGS. 7A and 7B). In the process of providing a folder chat room list, the message thread manager 340 may provide at least part of a message thread associated with a particular folder chat room, which is created first among all the folder chat rooms in the list or set up as a root folder chat room, so that the message thread is visualized as a default folder chat room even if there is no access request through the folder chat room list.

In an exemplary embodiment, the message thread manager 340 may provide the folder chat room receiving apparatus 120 with at least part of each of at least two of the message threads which are associated with the folder and which the folder chat room receiving apparatus 120 is found to have the right to access, so that the folder chat room receiving apparatus 120 render the message threads into folder chat rooms at the same time.

In an exemplary embodiment, the message thread manager 340 also may provide at least part of the message thread associated with the folder while in the process of providing a file list to the folder chat room receiving apparatus 120, so that the folder chat room receiving apparatus 120 visualizes information on the folder, the file list, and at least part of the message thread altogether through a file sharing agent.

In an exemplary embodiment, when a folder is created by a folder creator, the message thread manager 340 may create a message thread associated with the folder and determine at least one participant in the folder chat room by inviting users by the folder creator. More specifically, when a particular folder is created by a folder creator, the message thread manager 340 may immediately create a message thread associated with that particular folder and ask the folder creator to designate at least one user participating in the folder chat room in order to invite users.

In another exemplary embodiment, when a folder is created, the message thread manager 340 may wait for a message thread associated with that folder to be created, and create a message thread associated with that folder each time it receives a folder chat room creation request from the folder creator of the folder or a folder sharer.

The message thread manager 340 may approve a user invitation request based on whether the user invitation request is for a folder sharer of the folder. For example, the message thread manager 340 may determine a participant in the folder chat room by making a user invitation to a user who is designated by the folder creator or a participant in the folder chat room and is one of the folder sharers of the folder.

In an exemplary embodiment, if the user invitation request is for at least one user who is not a folder sharer, the message thread manager 340 may first send a folder sharing invitation to each of the at least one user and then send a user invitation if the folder sharing invitation is approved.

Upon receiving a folder message from a sender, who is one of the participants of the folder chat room, the message thread manager 340 may inform a recipient terminal associated with a recipient, who is one of the participants of the folder chat room, that the folder message has arrived. More specifically, when a folder message is added to the message thread by one of the participants in the folder chat room, the message thread manager 340 may immediately provide the added folder message to folder chat room receiving apparatuses 120 associated with online participants in the folder chat room, update the message thread, and provide a notification message about the update of the message thread to the folder chat room receiving apparatuses 120 associated with the participants except the sender. In an exemplary embodiment, the folder message may include at least one among the sender, the message content, the time when the message was sent, and the message type, and the message type of each folder message may be defined as one among a chat message, a task object message, and a file object message.

In an exemplary embodiment, upon receiving a file object from a sender, who is one of the participants in the folder chat room, the message thread manager 340 may add to the message thread a file object message containing an access link for access the file object, and may let one of the participants open or modify the file object only when accessing the file object through the folder chat room. For example, the message thread manager 340 may automatically add a received file object to the folder or to a particular sub-folder of the folder and associate the message thread with the file object, and when a folder chat room receiving apparatus 120 associated with a participant in the folder chat room opens the file object through a file list in the folder or a sub-folder, it may be allowed read-only access, and when the folder chat room receiving apparatus 120 opens the file object through the folder chat room, it may be allowed to edit the file, change the filename, or delete the file.

In another exemplary embodiment, the message thread manager 340 may receive a file object as a folder message, which is transmitted from one of at least one participant through the folder chat room. The message thread manager 340 may receive a file object which is transmitted from one of the participants through the folder chat room and add the received file object as a folder message to the message thread.

The message thread manager 340 may receive a task object from a task creator, one of the participants in the folder chat room, through the folder chat room, which contains task details and a task assignee and about which the task assignee may give feedback, and may add the received task object as a task object message to the message thread.

More specifically, the message thread manager 340 may receive a task from a folder chat room receiving apparatus 120 corresponding to the task creator through the folder chat room, which is created by the task creator and contains at least one among task details, a task assignee, a task rating, and a deadline, and may create a task object containing at least one among task details, a task creator, a task assignee, a task rating, and a deadline and associate the task object with the message thread.

The message thread manager 340 may add a task object to the message thread as a task object message, which may be accessed directly by the participants through the folder chat room, and which is distinct from a text message or multimedia message. Here, the task assignee is a participant in the folder chat room who is assigned by the task creator to perform the task, and the task rating may include a reserved rating, which is the highest rating limit that can be given by the task creator upon completion of the task, and an actual rating. Accordingly, the task creator may assign or rate the task by chatting to the task assignee in the folder chat room through the task object represented by a task object message.

The message thread manager 340 may keep up with the progress of the task object, including a task progress status indicating how the task is progressing by stages, and may update the task object by keeping up with the progress based on feedback from the task assignee. In an exemplary embodiment, the message thread manager 340 may update the task object added as a task object message to the message thread by updating a predetermined task progress status on a task progress diagram which defines how the task is progressing by stages, based on a request from either the task creator or task assignee and a response from the other. For example, the task progress status may include 'New' which indicates that a new task object is created, "Doing" which indicates that the task assignee is working on the task object, "Done" which indicates that the task assignee has completed the task object and waits for an interaction with the task creator about the completion of the task, and "Checked" which indicates that the task creator has checked the task object completed by the task assignee.

The message thread manager 340 may keep track of the progress of the task object by updating the task progress status of the task object based on task object-related responses exchanged between the task creator and the task assignee. Here, the task object-related responses correspond to responses related to the task object that can be sent by the folder chat room receiving apparatus 120 associated with the task creator or task assignee. In an exemplary embodiment, the task object-related responses may include at least one among a task check response, a task completion response, and a task evaluation response, depending on the current status of the task object. For example, if the message thread manager 340 receives a task interaction from a user corresponding to the task assignee about a "New" task object, it may update the task progress status to the subsequent progress status "Doing".

In an exemplary embodiment, the message thread manager 340 may receive task-related responses from the folder chat room receiving apparatus 120 associated with the task creator or task assignee through a control interface about a task object in a folder chat room-based file sharing agent, and upon receiving a task object-related response, may determine the current task status and update the corresponding message thread.

The message thread manager 340 may keep up with the progress of the task object and then eventually receive an evaluation for the task object from the task creator and give the task object a task rating.

The message thread manager 340 may provide a reminder message related to the task object to request completion of the task in progress according to specific criteria for repetition until the task in progress is brought to completion. In an exemplary embodiment, the specific criteria for repetition may be determined for each task progress status based on the deadline or task importance specified by the task creator. The message thread manage 340 may add a reminder message containing the reminder details and the number of times the task assignee was reminded to the message thread, according to specific criteria for repetition (for example, every 12 hours), and may change the task progress status of the task object based on the task assignee's response to the reminder message.

In a first exemplary embodiment, in the process of creating a message thread, the message thread manager 340 may store the message thread in the folder as a folder message file defined by a server only file attribute. Here, the server only file attribute is a file attribute by which only a folder chat room providing apparatus 110 functioning as a server can access and manage the message thread. For example, even if a folder chat room receiving apparatus 120 accesses the folder, the folder chat room providing apparatus 110 may restrict the folder chat room receiving apparatus 120's direct access to the message thread according to the server only file attribute of the folder message file in the folder, and may provide the folder chat room receiving apparatus 120 with a list of files except the folder message file with the server only file attribute so as to keep the user from checking the presence or absence of the folder message file or requesting to access the file.

In the above first exemplary embodiment, the folder manager 330 may store the folder message file in association with a file object or sub-folder in the folder, based on a request from the folder chat room receiving apparatus 120. For example, upon receiving a request to form an association between the folder chat room and a first file object in the folder from one of the participants in the folder chat room, the message thread manager 340 may associate the folder message file with the first file object. In another example, upon receiving a request to create a folder chat room associated with the first file object in the folder from a folder sharer, the message thread manager 340 may create a message thread that is associated with the folder and is also associated with the first file object. In the above examples, the file list provider 320 may provide a file list containing association information of that file object so that the folder chat room receiving apparatus 120 displays the association information of that file object through an association indicator symbol 724 in the process of visualizing the file list (see FIGS. 7A and 7B).

In the above first exemplary embodiment, upon receiving a request to move the folder message file or a file object or sub-folder associated with the folder message file, the message thread manager 340 may move the folder message file and the file object or sub-folder associated with the folder message file to another folder. For example, it is assumed that a folder message file in a first folder is associated with a first file object in the same folder. In this case, upon receiving a request to move the folder message file in the first folder to a second folder, the message thread manager 340 may move both the folder message file and the first file object to the second folder. Likewise, upon receiving a request to move the first file object stored in the first folder to the second folder, the message thread manager 340 may move both the first file object and the folder message file to the second folder. In an exemplary embodiment, upon receiving a movement request from any of the participants in the folder chat room, the message thread manager 340 may approve the request based on whether the participants in the folder chat room are included in the folder sharers of the target folder or match with them.

In a second exemplary embodiment, in the process of creating a message thread, the message thread manager 340 may store the message thread in a specific area of a file system and manage the association between the folder and the message thread through a folder message database (not shown). In an exemplary embodiment, the message thread manager 340 may store a message thread associated with a folder in the memory 220 and manage it, and create a new association between the folder and the message thread and update the folder message database. In an exemplary embodiment, the message thread manager 340 may manage the message thread as a system file and keep the folder chat room receiving apparatus 120 from accessing it.

In the above second exemplary embodiment, upon receiving a request to move the folder or change the folder name, the message thread manager 340 may update the association between the folder and the message thread by modifying the folder message database.

In the above second exemplary embodiment, the message thread manager 340 may form an association between the message thread and a file object or sub-folder in the folder by modifying the folder message database based on a request from the folder chat room receiving apparatus 120.

In the above second exemplary embodiment, upon receiving a request to move the folder chat room or a file object or sub-folder associated with the folder chat room to another folder, the message thread manager 340 may update the association among the folder, the message thread, the file object or sub-folder associated with the message thread, and the another folder by modifying the folder message database. For example, it is assumed that a message thread associated with a second folder is also associated with a second file object in the same folder. In this case, upon detecting an attempt to move the message thread to a third folder, the message thread manager 340 may modify the folder message database so as to eliminate the association between the message thread defined in the folder message database and the second folder, form an association between the message thread and the third folder, and move the second file object associated with the message thread to the third folder.

In a third exemplary embodiment, in the process of creating a message thread, the message thread manager 340 may store the message thread in the folder as a folder message file defined by a hidden attribute. In this case, the file list provider 320 may provide a file list excluding the folder message file defined by the hidden attribute.

In the above exemplary embodiments, upon receiving a request to delete a file object associated with a particular message thread or eliminate the association between them, the folder manager 330 may approve the request only when the requestor is the person who opened the folder chat room or a participant of the folder chat room, and, with the approval, may eliminate the association between the message thread and the file object and delete the file object.

In the above exemplary embodiments, upon completion of the movement of a file object associated with a folder chat room, the folder manager 330 may immediately update the folder chat room list and provide the updated folder chat room list to the receiving apparatus 120.

If all the participants in the folder chat room leave the folder chat room, the message thread manager 340 may delete the message thread.

If the folder chat room is designated as a root folder chat room, the controller 350 may have the folder chat room set up as the root folder chat room for the folder and its sub-folders until a sub-folder chat room is designated as another root folder chat room. For example, it is assumed that a first folder has first to third sub-folders and each sub-folder has their respective folder chat room associated with them. In this case, upon receiving a request to set up a first folder's folder chat room as a root folder chat room from the folder creator of the first folder, the controller 350 may set up the first folder's folder chat room as the root folder chat room for the first to third sub-folders. Accordingly, upon receiving a request for access to the second sub-folder from a folder chat room receiving apparatus 120, the controller 350 may provide at least part of the message thread associated with the first folder, instead of the message thread associated with the second sub-folder, first to the folder chat room receiving apparatus 120 so that the folder chat room receiving apparatus 120 visualizes the message thread associated with the first folder whose folder chat room is set up as the root folder chat room, while visualizing a file list of the second sub-folder. Then, when the user selects another folder chat room through a folder chat room list, the controller 350 may immediately provide the message thread of the selected folder chat room to the folder chat room receiving apparatus 120.

In an exemplary embodiment, upon receiving a request to set up a folder chat room associated with a particular folder as a root folder chat room, the controller 350 may check whether the folder is a next-higher level folder or a sub-folder of the next-higher level folder, and, if so, may approve the setup request. In an exemplary embodiment, upon receiving a request to provide not the root folder chat room, but the folder chat room of the folder, from the folder chat room receiving apparatus 120, the controller 350 may discontinue providing the message thread for the root folder chat room and start providing the message thread associated with the folder.

Each time a message is added to the folder chat room, the controller 350 may detect statistical information about messages not read by the user from all the message threads in the folder and its sub-folders, and reflect it on the count of unread messages in the folder. Each time a message is added to a folder or sub-folder, the controller 350 may update the count of unread messages in each folder or sub-folder by detecting accumulated unread messages in the entire sub-folders and immediately provide the updated count of unread messages to the folder chat room receiving apparatus 120 so that the folder chat room receiving apparatus 120 shows the count of unread messages in each folder or sub-folder through a unread message count symbol while in the process of visualizing the folders and its sub-folders through a user interface (see FIGS. 7A and 7B).

The controller 350 may detect statistical information about task objects created through at least one message thread associated with the folder and all its sub-folders, and reflect it on cumulative statistical counts for the folder. The controller 350 may include statistical operation results, which are obtained based on at least one of the following: the number of folder chat rooms created in the folder and its sub-folders, the number of file objects, the number of sub-folders, the creators, and the participants, in the cumulative statistical counts for the folder. In an exemplary embodiment, the controller 350 may perform a statistical operation based on at least one of the following: the number of task objects created through the folder chat rooms in the folder and its sub-folders, the number of processes, task creators, and task assignees, and reflect the results on cumulative statistic counts for the folder. For example, the controller 350 may calculate statistical information about how many folder chat rooms there are in the folder and its sub-folders and how many task objects are created through these folder chat rooms, and reflect it on the cumulative statistical counts for the folder. Also, the controller 350 may provide cumulative statistical counts for each folder to the folder chat room receiving apparatus 120 in the process of providing a file list so that the folder chat room receiving apparatus 120 shows the cumulative statistical counts for each folder through cumulative statistical count symbols 726 (see FIGS. 7A and 7B).

The controller 350 may detect task objects that meet reminder requirements at specific time intervals, from among the task objects created through at least one message thread associated with the folder and its sub-folders, and reflect them in a today's list of tasks in the folder, and may provide the folder chat room receiving apparatus 120 with a today's list of tasks detected from all the folders and their corresponding sub-folders so that the folder chat room receiving apparatus 120 visualize a list of reminder task objects through a user interface. In an exemplary embodiment, the reminder requirements may be determined based on the task progress status and the deadline.

The controller 350 may perform filtering on the folder or arrange the folder based on statistical information about the unread messages or statistical information about the task objects, according to a request from the folder chat room receiving apparatus 120. For example, the controller 350 may provide statistical information about unread messages and task objects for each folder so that the folder chat room receiving apparatus 120 arranges the folders in order of highest number of unread messages in each folder, in order of highest number of created messages, or in order of highest number of created task objects. In another example, the controller 350 may perform filtering only on the folders of folder chat rooms with unread messages or the folders associated with task objects created by a particular user who is designated by the requestor from among the folder sharers and present these folders.

The controller 350 may provide the folder chat room receiving apparatus 120 with the level of activity of the folder chat room calculated for each folder and arrange the folders in order of highest level of activity. In an exemplary embodiment, the level of activity of a folder chat room may be calculated based on at least one of the following: the number of created task objects, the number of participants, and the frequency of updates to the message thread.

In an exemplary embodiment, the controller 350 may calculate the activity index (a) of each folder chat room by the following Equation 1, and assess the folder chat room as having a specific level of activity depending on the range of the calculated activity index (a). For example, the activity index (a) of a folder chat room in which there are six participants, three task objects were created, and the average frequency of message updates for the last three days is 3 hours may be calculated as 6, and the level of activity may be assessed as 'high'. For example, the controller 350 may assess the level of activity according to the calculated activity index (a)—that is, 'very high' if a <1, 'high' if 1≤a<10, 'normal' if 10≤a<25, 'low' if 25≤a<50, and 'very low' if a≥50.

$$a = \frac{u \times r}{w} \quad \text{[Equation 1]}$$

where r is an integer rounded off at time intervals, which indicates the time difference between the current time and the last time the message thread was updated, w indicates the number of task objects created through the message thread, and u indicates the number of participants in the chat room.

In an exemplary embodiment, when a folder chat room is created in association with a particular file object, the controller 350 may allow an online participant in the folder chat room to share real-time operations on the file object. For example, the controller 350 may receive a request to share operations on the associated file object from a particular online participant who is opening the folder chat room, and may provide other online participants who are opening the folder chat room in real time with information about the requestor's operations of modifying, adding, and deleting specific content of the file object so that real-time operations are shared through part of the interface of the folder chat room. In another example, when an online participant in the folder chat room opens the file object in an editable form and modifies, adds, or deletes specific content, or when the file object is updated by this operation, the controller 350 may inform of this operation by adding a notification message to the message thread of the corresponding folder chat room, indicating that the operation was performed or the update was made.

In an exemplary embodiment, when an association between a file object in the folder and the folder chat room is formed, or when a file object associated with the folder chat room is modified or deleted, the controller 350 may add a notification message to the message thread, about the formation of the association or the modification or deletion of the file object. More specifically, upon receiving a request to form an association between a particular file object in a folder and the corresponding chat room from one of the participants in the folder chat room, or when a change is made, such as when the file object is modified or deleted or when an existing association between the file object and the folder chat room is eliminated, the controller 350 may add a folder message to the message thread, which includes at least one of the following: who made the change, what the change is about (for example, a change of the file object name and the type of change (Ex. modification, deletion, etc.), the date and time of change, and an access link to the file object, and inform the chat room participants of this. For example, as shown in FIGS. 7A and 7B, a notification message saying, "Choi Jae-Ho modified the "Functional filter production quailtiy.docx" file at 11:43 am, on Sep. 1, 2017" may be provided through the folder chat room.

In an exemplary embodiment, each time a file object associated with the folder chat room is updated, the controller 350 may detect the number of updates to the associated file object not checked by the user by counting the cumulative number of updates, and may reset the number of unchecked updates when the associated file object is opened by the user. For example, the controller 350 may calculate and manage the number of unchecked updates by cumulatively adding up the number of modifications each time a file object (functional filter production quality) associated with a folder chat room is modified by one of the participants in the folder chat room. Also, when the folder chat room receiving apparatus 120 has accessed the file object and opened or received (downloads) the file object, the controller 350 may determine that the user has checked the updates to the file object and reset the number of unchecked updates to zero. The controller 350 may provide the folder chat room receiving apparatus 120 with the number of unchecked updates to the file object associated with the folder chat room so that the folder chat room receiving apparatus 120 indicates the number of unchecked updates through an associated file update information indicator symbol 739 in the process of rendering the folder chat room, and, as shown in FIGS. 7A and 7B, displays whether the file object (functional filter production quality) is updated  and the number of unchecked updates (3 unchecked updates). Accordingly, the controller 350 may inform of the number of modifications to a file object associated with the folder chat room the user participating in the folder chat room has not checked until now, thereby inducing the user to check the updates to the file object in a more effective way and improving the efficiency of task processes between the participants.

In another exemplary embodiment, when a file object associated with the folder chat room is updated, the controller 350 may keep track of the number of users accessing the file object until another update to the file object and provide the tracking results to the folder chat room receiving apparatus 120. For example, when a file object (functional filter production quality) associated with the folder chat room is modified, the controller 350 may keep track of the number of users who checked the modification by counting the cumulative number of requestors who requested to open or provide the updated file object, and may provide the folder chat room receiving apparatus 120 with associated file update information including whether the file object is updated and the number of users who checked the update as the tracking results, so that the folder chat room receiving apparatus 120 displays the number of users who checked the update through an associated file update information indicator symbol 739 or through a separate interface.

The controller 350 may control the overall operation of the processor 210, and may control data flow among the folder access manager 310, file list provider 320, folder manager 330, and message thread manager 340.

FIG. 4 is a flowchart illustrating a folder chat room providing procedure performed by the processor in FIG. 2.

In FIG. 4, the folder access manager 310 may receive a request for access to a folder from the folder chat room receiving apparatus 120 (step S410). The file list provider 320 may provide a list of files in the folder (step S420). The message thread manager 340 may determine the folder chat room receiving apparatus 120's right to access to a folder chat room and provide at least part of a message thread that is associated with that folder and may be rendered as a folder chat room on the folder chat room receiving apparatus 120 (step S430).

Figure 5:
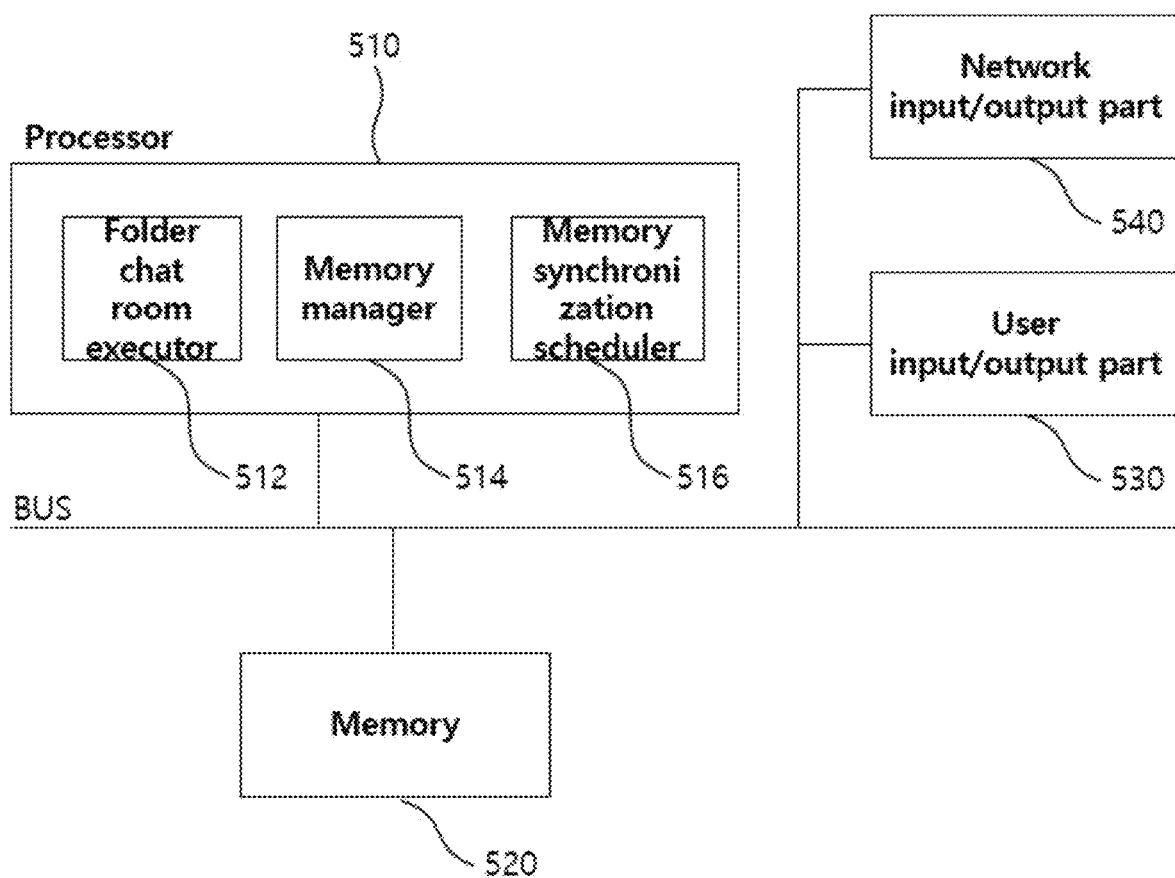
FIG. 5 is a block diagram showing the folder chat room receiving apparatus in FIG. 1.

FIG. 5 is a block diagram showing the folder chat room receiving apparatus in FIG. 1.

Referring to FIG. 5, the folder chat room receiving apparatus 120 may include a processor 510, a memory 520, a user input/output part 530, and a network input/output part 540.

Figure 6:
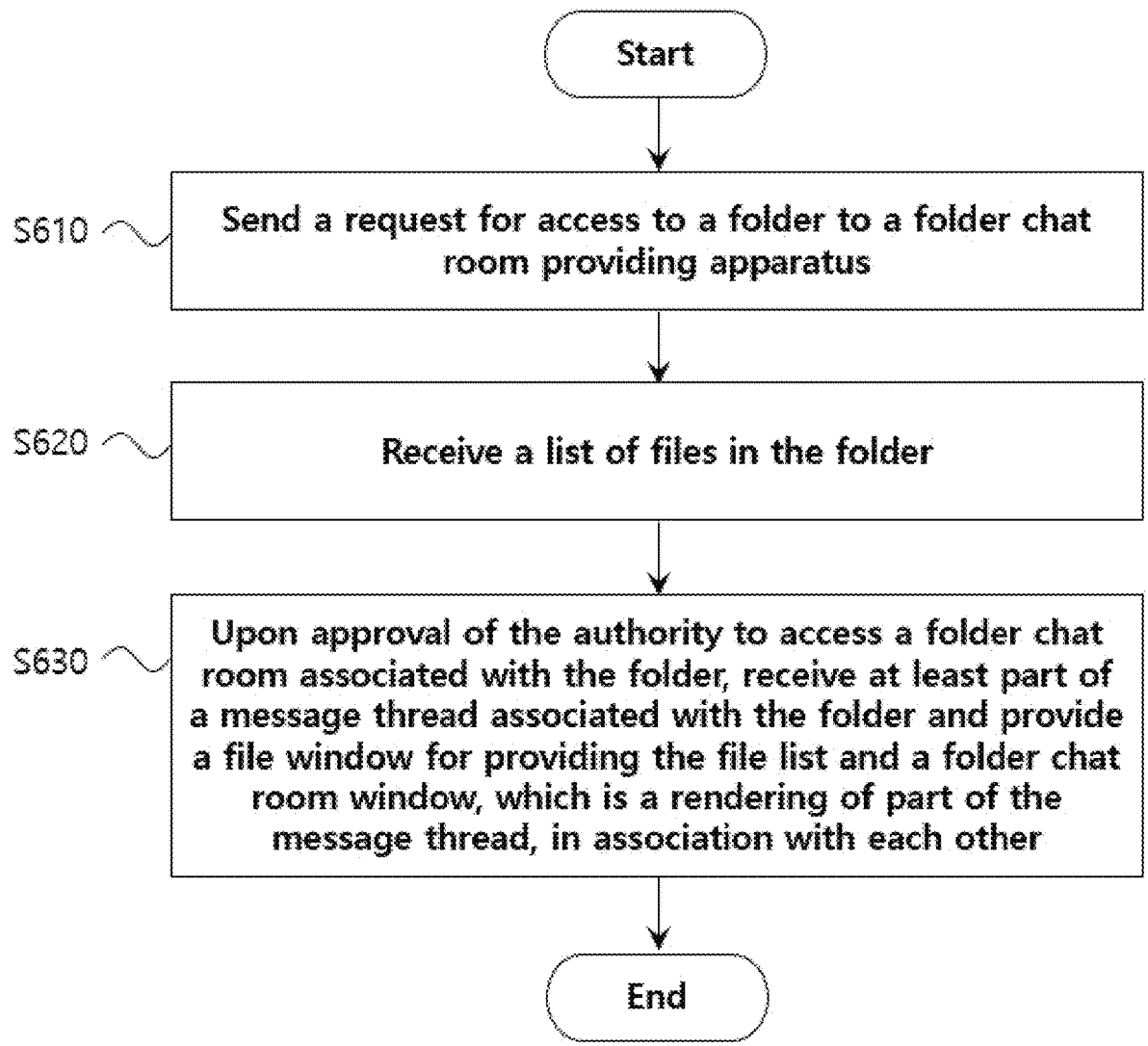
FIG. 6 is a flowchart illustrating a folder chat room receiving procedure performed by the processor in FIG. 5.

The processor 510 may include a folder chat room executor 512 capable of executing a folder chat room receiving procedure in FIG. 6, a memory manager 514 capable of managing the memory 520 which is read or written by the folder chat room executor 512, and a memory synchronization scheduler 516 capable of scheduling time synchronization between volatile and non-volatile memories in the memory 220. The processor 510 may control the overall operation of the folder chat room receiving apparatus 120, may be electrically connected to the memory 520, user input/output part 530, and network input/output part 540 and control data follow between them, and may be as a CPU (Central Processing Unit) of the folder chat room receiving apparatus 120.

The processor 510 may send the folder chat room providing apparatus 110 a request for access to a folder. The processor 510 may receive a list of files in the folder, and, upon approval of the access request from the folder chat room providing apparatus 110, may receive the list of files in the folder from the folder chat room providing apparatus 110 and visualize it.

Once access to a folder chat room associated with the folder is approved, the processor 510 may receive at least part of a message thread associated with the folder from the folder chat room providing apparatus 110 and provide a file window 720 for providing the file list and a folder chat room window 730, which is a rendering of part of the message thread. In an exemplary embodiment, the processor 510 may associate a file window and a chat room window with each other through a folder chat room-based file sharing agent, and, when one of the two windows is moved on a display interface by the user, may provide the other window as well in association (see FIGS. 7A and 7B), and visualize the file list and render the folder chat room through the respective windows.

The processor 510 may send a folder creation request including at least one user designated as a folder sharer to the folder chat room providing apparatus 110 based on a user request. Once a folder is created, the processor 510 may send a user invitation request including at least one user designated by the user in order to determine the participants in the folder chat room.

The processor 510 may visualize a corresponding notification message each time it receives a notification about the arrival of a folder message from the folder chat room providing apparatus 110.

The processor 510 may send a request to move a folder chat room or a file objet or sub-folder associated with the folder chat room to the folder chat room providing apparatus 110 based on a user request, and, upon approval of the movement request, may receive updated folder information and a file list from the folder chat room providing apparatus 110 and visualize how the movement was done as requested.

In an exemplary embodiment, the processor 510 may receive from the folder chat room providing apparatus 110 at least one of the following: the count of unread messages in the folder, cumulative statistical counts, and a today's list of tasks and provide each information through a file window.

The memory 520, user input/output part 530, and network input/output part 540 may perform substantially the same functions as the above-described memory 220, user input/output part 230, and network input/output part 240, so descriptions thereof will be omitted.

FIG. 6 is a flowchart illustrating a folder chat room receiving procedure performed by the processor in FIG. 5.

In FIG. 6, the processor 510 may send a request for access to a folder to the folder chat room providing apparatus 110 (step S610). The processor 510 may receive a list of files in the folder (step S620). Upon approval of access to a folder chat room associated with the folder, the processor 510 may receive at least part of a message thread associated with the folder from the folder chat room providing apparatus 110 and provide a file window for providing the file list and a folder chat room window, which is a rendering of part of the message thread, in association with each other (step S630).

FIGS. 7A and 7B are views showing an exemplary embodiment of a process in which the folder chat room receiving apparatus in FIG. 1 provides a file sharing interface by working in conjunction with a folder chat room providing apparatus.

In FIGS. 7A and 7B, a folder chat room receiving apparatus 120 may display overall information on a folder through a file sharing interface 700 in a folder chat room-based file sharing agent installed on the folder chat room receiving apparatus 120, based on overall information on the folder received from the folder chat room providing apparatus 110, and may send to the folder chat room providing apparatus 110 a request for accessing or creating a folder, sending, receiving, or moving a file object, and creating a folder chat room through the file sharing interface 700.

The folder chat room receiving apparatus 120 may receive a list of folders associated with the user from the folder chat room providing apparatus 110 and visualize the folder list and information on the currently accessed folder through a folder window 710 of the file sharing interface 700. Accordingly, the user may view a list of folders they can share as a folder sharer through the folder window 710, and attempt to access a particular folder in the folder list. Also, the folder chat room receiving apparatus 120 may show the count of unread messages in the folder through an unread message count symbol 712 based on unread message count information provided for each folder from the folder chat room providing apparatus 110 so as to inform the user of the number of chat messages added to the folder chat rooms in the folder and its sub-folders and not read by the user (for example, as in FIG. 7, there are 9 unread chat messages in the currently selected folder "04. Productivity Improvement", and there are 8 unread chat messages in a non-selected folder "06. Customer Satisfaction".

The folder chat room receiving apparatus 120 may receive a list of files in the currently accessed folder and folder sharer information from the folder chat room providing apparatus 110 and visualize schematic information on each of the file objects and sub-folders in the folder through the file window 720 of the file sharing interface 700. The folder chat room receiving apparatus 120 may visualize at least one of the following: the filename of each of the file objects and sub-folders in the folder, the file type, the creator, the date and time of creation, the size, the level of activity, and the association through the file window 720, and show the count of unread messages for each sub-folder through a sub-folder unread message count symbol 722. The folder chat room receiving apparatus 120 may display association information about each file object in the file list received from the folder chat room providing apparatus 110 through an indicator symbol 724 and visualize whether the file object is associated with the folder chat room of the folder, and may display cumulative statistical counts for the folder in the received file list through cumulative statistical count symbols 726 and visualize the number of all the folder chat rooms in the folder and its sub-folders (the number of folder chat rooms: 5), the number of task objects created through all the folder chat rooms (the number of tasks: 9), and the number of all the file objects in the sub-folders (the number of files: 11).

Upon receiving a specific user input (e.g., the user's touch on an empty space, a right-mouse click, etc.) through the folder window 710 or file window 720, the folder chat room receiving apparatus 120 may additionally provide a folder control interface and receive a user request for creating a new folder through the folder control interface, creating a new sub-folder in the folder, creating a new folder chat room, transmitting a new file object (uploading a file), receiving a particular file object (downloading a file), forming an association between a particular file object and a folder chat room, eliminating a formed association, moving a folder chat room or file object to another folder, or inviting a folder share.

The folder chat room receiving apparatus 120 may receive at least part of a message thread associated with the currently accessed folder form the folder chat room providing apparatus 110 and render at least part of the message thread as a folder chat room through the folder chat room window 730 of the file sharing interface 700. The folder chat room receiving apparatus 120 may send a folder message, which is either a chat message, folder object message, or file object message, to the folder chat room providing apparatus 110 through the folder chat room window 730 to make a request to add the folder message to the message thread.

The folder chat room receiving apparatus 120 may display a folder name associated with the folder chat room, the name of an associated file object, participants, etc. through a folder chat room key information indicator column 731, and may display whether the associated file (functional filter production quality) is updated  and the number of users who checked the file update (checked: 3) through an associated file update information indicator symbol 739.

The folder chat room receiving apparatus 120 may send a request to invite a user to the folder chat room through a user invitation menu 732, display the number of task objects created for each task progress status (new, doing, done, and checked) through the folder chat room, and allow the user to access the task objects according to a user input.

The folder chat room receiving apparatus 120 may provide a folder message through a message indicator column 734. For example, the folder chat room receiving apparatus 120 may present a task object created through the folder chat room as an independent task object message, distinct from a general chat message or multimedia message, as in Identification Number 735, and may visualize the task details, task creator, task assignee, and task progress status of the task object (regarding the task progress status, the current task status may be indicated by symbols corresponding to the current phases of work such as New (●○○○), Doing (○●○○), Done (○○●○), or Checked (○○○●)). In another example, the folder chat room receiving apparatus 120 may provide a reminder message for a task object deemed to need reminding, among the task objects created through the folder chat room, as in Identification Number 736, and the provided reminder message may include information on the task object to be reminded (the assignee, deadline, and current task progress status of the task object) and a status change button for changing the current task progress status of the task object to the next phase (the task assignee may change the current task progress status from "doing" to "done").

The folder chat room receiving apparatus 120 may receive a task object creation request containing task information about a task creator, a task assignee, task details, and a task rating through a task object creation button 737 and send it to the folder chat room providing apparatus 110. Accordingly, the folder chat room providing apparatus 110 may create a task object and add it as a folder message to the corresponding message thread, and the folder chat room receiving apparatus 120 may receive update information on the message thread and visualize the task object as a task object message within the corresponding folder chat room in a way similar to Identification Number 735.

The folder chat room receiving apparatus 120 may send a chat received from a user to the folder chat room providing apparatus 110 through the folder chat room window 730 and visualize the messages in the message thread which is updated in real time by the folder chat room providing apparatus 110 through the message indicator column 734.

The folder chat room receiving apparatus 120 may visualize a folder chat room list received from the folder chat room providing apparatus 110 through a folder chat room list indicator column 738, and, when another folder chat room is selected by the user through the folder chat room list indicator column 738, may send to the folder chat room providing apparatus 110 a request for opening the selected folder chat room and receive at least part of the requested message thread from the folder chat room providing apparatus 110 and visualize the newly received folder chat room instead of the existing folder chat room.

The disclosed technology may have the following effects. However, since it does not represent that a specific embodiment should include all the following effects or should include only the following effects, it should not be understood that the scope of the disclosed technology is limited thereby.

According to an exemplary embodiment of the present invention, an apparatus for providing a folder chat room and an apparatus for receiving the same are capable of improving the efficiency of folder sharing by supporting communication between folder-sharing users through a folder chat room.

According to an exemplary embodiment of the present invention, an apparatus for providing a folder chat room and an apparatus for receiving the same are capable of increasing the convenience of use for folder sharers by providing users with a folder chat room for each folder where they can communicate with each other.

According to an exemplary embodiment of the present invention, an apparatus for providing a folder chat room and an apparatus for receiving the same are capable of increasing the efficiency of task processing between folder sharers by showing the count of unread messages in a folder chat room for each folder.

Although preferred exemplary embodiments of the present invention have been described above, those skilled in the art will understand that the present invention may be variously modified and changed without departing from the spirit and scope of the present invention described in the following claims.

What is claimed is:

1. An apparatus for providing a folder chat room, the apparatus comprising:
   a memory; and
   a processor electrically connected to the memory,
   wherein the processor is configured to
      receive a request for access to a folder constituting a file system from a folder chat room receiving apparatus,
      provide a list of files in the folder,
      provide each folder chat room which at least one sharer of the folder is participating in with one or more other participants and which is created specific to the folder with access rights for the participants, and
      determine whether a user associated with the folder chat room receiving apparatus is one of the participants when the folder chat room receiving apparatus accesses a selected folder chat room, so as to provide at least part of a message thread that is rendered as the selected folder chat room on the folder chat room receiving apparatus,
   wherein, upon receiving a folder message associated with a respective folder from a sender, who is one of the participants of a respective folder chat room created specific to the respective folder, the processor updates a respective message thread for the respective folder chat room and informs a recipient terminal associated with each recipient when the folder message is received,
   wherein each recipient is one of the participants of the respective folder chat room other than the sender,
   wherein the processor informs the recipient terminal associated with each recipient by providing a notification message about the received folder message in the updated respective message thread, and
   wherein the notification message includes content of the folder message.

2. The apparatus of claim 1, wherein, when the folder is created by a folder creator, the processor creates the message thread and determines at least one participant in each folder chat room by inviting one or more users by the folder creator.

3. The apparatus of claim 2, wherein the processor approves a user invitation request based on whether the user invitation request is for a folder sharer of the folder.

4. The apparatus of claim 3, wherein, if the user invitation request is for at least one user who is not a folder sharer, the processor first sends a folder sharing invitation to each of the at least one user and then sends the user invitation if the folder sharing invitation is approved.

5. The apparatus of claim 1, wherein the processor receives a task object from a task creator, one of the participants in the respective folder chat room, through the respective folder chat room, which contains task details and a task assignee and about which the task assignee gives feedback, and adds the received task object as a task object message to the message thread.

6. The apparatus of claim 1, wherein, upon receiving a file object from a sender, who is one of the participants of the respective folder chat room, the processor adds to the message thread a file object message containing an access link for access the file object, and lets one of the participants open or modify the file object only when accessing the file object through the respective folder chat room.

7. The apparatus of claim 1, wherein, in the process of creating a message thread, the processor stores the message thread as a folder message file defined by a server only file attribute.

8. The apparatus of claim 7, wherein the processor stores the folder message file in association with a file object or sub-folder in the folder, based on a request from the folder chat room receiving apparatus.

9. The apparatus of claim 8, wherein, upon receiving a request to move the folder message file or a file object or sub-folder associated with the folder message file, the processor moves the folder message file and the file object or sub-folder associated with the folder message file to another folder.

10. The apparatus of claim 1, wherein, in the process of creating a message thread, the processor stores the message thread in a specific area of a file system and manages the association between the folder and the message thread through a folder message database.

11. The apparatus of claim 10, wherein, upon receiving a request to move the folder or change the folder name, the processor updates the association between the folder and the message thread by modifying the folder message database.

12. The apparatus of claim 10, wherein the processor forms an association between the message thread and a file object or sub-folder in the folder by modifying the folder message database based on a request from the folder chat room receiving apparatus.

13. The apparatus of claim 12, wherein, upon receiving a request to move a respective folder chat room or a file object or sub-folder associated with the respective folder chat room to another folder, the processor updates the association among the folder, the message thread, the associated file object or sub-folder, and the another folder by modifying the folder message database.

14. The apparatus of claim 1, wherein, if a respective folder chat room is designated as a root folder chat room, the processor has the respective folder chat room set up as the root folder chat room for the folder and sub-folders thereof until a sub-folder chat room is designated as another root folder chat room.

15. The apparatus of claim 1, wherein, each time a message is added to a respective folder chat room, the processor detects statistical information about messages not read by the user from all the message threads in the folder and sub-folders thereof and reflect the same on a count of unread messages in the respective folder chat room.

16. The apparatus of claim 15, wherein the processor detects statistical information about task objects created through at least one message thread associated with the folder and all the sub-folders thereof and reflect the same on cumulative statistical counts for the folder.

17. The apparatus of claim 16, wherein the processor detects task objects that meet reminder requirements at specific time intervals, from among the task objects created through the at least one message thread, and reflect the same in a today's list of tasks in the folder.

18. The apparatus of claim 16, wherein the processor performs filtering on the folder or arrange the folder based on statistical information about the unread messages or statistical information about the task objects, according to a request from the folder chat room receiving apparatus.

19. The apparatus of claim 1, wherein, when an association between a file object in the folder and a respective folder chat room is formed, or when a file object associated with the folder chat room is modified or deleted, the processor adds an operation notification message to the message thread for the respective folder chat room, about the formation of the association or the modification or deletion.

20. The apparatus of claim 1, wherein the folder chat room list contains recently-added information about each folder chat room created specific to the folder with the access rights for the user.

21. The apparatus of claim 1,
wherein the notification message further indicates a message type of the folder message, and
wherein the message type of the folder message indicated by the notification message is one of a chat message, a task object message, or a file object message.

* * * * *